UNITED STATES PATENT OFFICE.

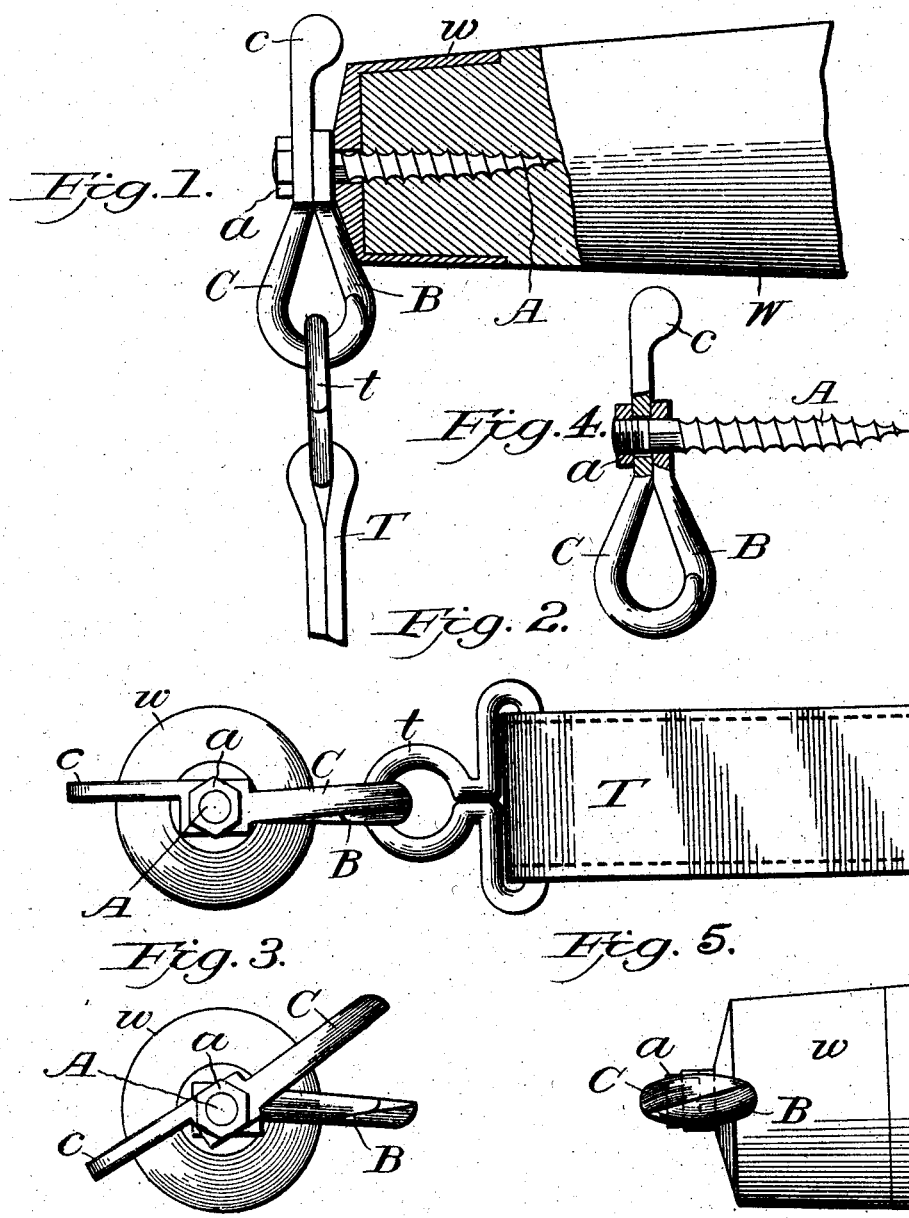

JACOB GANSLEY, OF VICTOR, IOWA.

WHIFFLETREE-HOOK.

No. 796,314.　　Specification of Letters Patent.　　Patented Aug. 1, 1905.

Application filed January 5, 1905. Serial No. 239,736.

*To all whom it may concern:*

Be it known that I, JACOB GANSLEY, of Victor, in the county and State of Iowa, have invented certain new and useful Improvements in Whiffletree-Hooks; and I hereby declare that the following is a full, clear, and exact description thereof, reference being had to the accompanying drawings, which form part of this specification.

This invention is an improvement in whiffletree-hooks; and its object is to make a hook which can easily be attached to ordinary whiffletrees, will hold the traces securely when properly engaged therewith, and with which the traces can be easily engaged or disengaged.

The hook is especially designed for use with working harness or traces having metal rings or eyes on their ends to engage the hooks; and the invention consists in the novel construction of the hook as illustrated in the accompany drawings and hereinafter described with reference thereto.

In the drawings, Figure 1 is a plan view of the complete hook closed, a trace engaged therewith. Fig. 2 is a side view of Fig. 1. Fig. 3 is a side view of the hook open. Fig. 4 is a plan view thereof, partly in section, detached from the whiffletree; and Fig. 5 is a front end view.

The hook comprises a bolt or threaded shank A, adapted to be screwed into the end of the whiffletree W, so as to secure the hook thereto, as indicated in Fig. 1 of the drawings. To this shank A, near its outer end and projecting at right angles thereto, is rigidly attached the lower hook member B, which projects forwardly and lies horizontally at right angles to the shank and in the plane thereof, the forward end of said hook member B being bent into a C-hook form, as usual. Pivoted on the shank exterior to the member B is the second movable hook member C, whose forward end is curved like but oppositely to member B and overlies and rests upon the latter, the hook ends of the two members being oppositely tapered, as shown in Fig. 5, so that when closed upon each other they form a neat oval-shaped closed loop almost uniform in cross-section, in which the eye or ring $t$ of the trace T will be securely retained. The said eye can play in the hook without danger of being accidentally disengaged therefrom, and when the brace is under strain the eye will firmly hold the two members of the hook in closed position.

As shown, the movable member C of the hook has a rearward extension $c$, which serves as a finger-piece. By depressing this finger-piece $c$ the free end of hook member C is separated from the free end of member B, so that the trace-eye $t$ can be readily removed from or inserted into the hook.

The member C is retained on the shank by means of a suitable head $a$, which I prefer to make in the form of a nut screwed onto the end of the shank and riveted sufficiently to prevent its casual displacement, while allowing it to be forcibly removed in case either hook member should be broken and need repairing.

A band or cap $w$ may be used on the end of whiffletree, if desired, to prevent the latter splitting.

The manner of attaching the hook and its mode of use is obvious from the drawings. Briefly stated, the shank is screwed into the end of the whiffletree and the hook members arranged in the position shown in the drawings. The hook will normally remain closed by gravital action of member C. When it is desired to engage the trace-eye therewith, the hook is opened by raising member C and the eye $t$ slipped on member B and around until member C can be lowered. Then the eye slips upon member B and over the hook end of member C to the position indicated in the drawings and is securely retained. To disengage the trace from the hook, the eye is moved back on member B until member C can be raised, and then the eye is slipped off of member B beneath member C.

The hook, as shown, can be readily attached to ordinary whiffletrees without any particular fittings or additions. All of its parts can be made of wrought-iron, and it can be easily repaired if injured.

Having thus described my invention, what I claim as new, and desire to secure by Letters Patent, is—

1. In combination with a whiffletree, a threaded bolt screwed into the end thereof, a hook member rigidly attached to the bolt near the outer end thereof, a similar opposite hook member pivotally mounted on the bolt beside and exterior to the first member and having an integral finger-piece extending in rear of the bolt, the forwardly-extending curved ends of said hook members overlapping, and a device fast to the outer end of the bolt and retaining the pivoted hook member thereon, substantially as described.

2. In combination, a threaded bolt adapted to be screwed into the end of a whiffletree, a hook member rigidly attached to said bolt near the outer end thereof; a similar opposite hook member directly pivoted on said bolt beside and exterior to the first member, the curved ends of said hook members overlapping, and a nut screwed on the outer end of the bolt and retaining the pivoted member on the bolt, substantially as described.

In testimony that I claim the foregoing as my own I affix my signature in presence of two witnesses.

JACOB GANSLEY.

In presence of—
W. H. BOWMAN,
A. C. WILSON.